US008200200B1

(12) United States Patent
Belser et al.

(10) Patent No.: US 8,200,200 B1

(45) Date of Patent: Jun. 12, 2012

(54) LOCALIZED MOBILE DIGITAL TV

(75) Inventors: John Belser, Olathe, KS (US); David U. McKinney, Olathe, KS (US); Timothy Swan, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 797 days.

(21) Appl. No.: 12/025,478

(22) Filed: Feb. 4, 2008

(51) Int. Cl.
*H04M 3/42* (2006.01)

(52) U.S. Cl. .................. 455/414.1; 455/436; 455/456.2; 455/456.3; 455/456.6

(58) Field of Classification Search ............... 455/414.1, 455/456.1, 456.3, 456.5, 456.6, 436
See application file for complete search history.

(56) References Cited

U.S. PATENT DOCUMENTS 7,672,280 B2 * 3/2010 Shim et al. .................... 370/338
2002/0107027 A1 * 8/2002 O'Neil .......................... 455/456
2002/0150387 A1 * 10/2002 Kunii et al. ..................... 386/83
2003/0032389 A1 * 2/2003 Kim et al. .................... 455/3.01
2004/0157624 A1 * 8/2004 Hrastar ...................... 455/456.1
2006/0003780 A1 * 1/2006 Mamdani et al. ............. 455/466
2007/0149214 A1 * 6/2007 Walsh et al. ............... 455/456.1
2007/0254659 A1 * 11/2007 Paul et al. ...................... 455/436
2007/0287379 A1 * 12/2007 Matsuura et al. ............... 455/39
2008/0248822 A1 * 10/2008 Jarvinen et al. ............... 455/509
2008/0270235 A1 * 10/2008 Yoon et al. ...................... 705/14
2009/0185522 A1 * 7/2009 Periyalwar et al. ........... 370/328

* cited by examiner

*Primary Examiner* — Jinsong Hu
*Assistant Examiner* — Qun Shen

(57) ABSTRACT

Systems and methods are disclosed describing the transmission of multimedia data to a mobile device. A system describing some of the disclosed embodiments comprises a mobile digital television transmitter transmitting a primary data stream, a transceiver transmitting a secondary data stream, and a mobile device. In some embodiments the mobile device comprises a mobile display, a mobile transceiver, and a mobile processor and receives at least the primary data stream and the secondary data. The mobile device displays data from either the primary data stream or the secondary data stream, and transmits a mobile data stream to the transceiver. The mobile data stream may comprise information relating to the status of both the primary data stream and the secondary data stream. This system may also include a server in communication with the transceiver, wherein the server is capable of determining the signal conditions of the mobile device based upon the mobile data stream and alter the secondary data stream based upon the mobile data stream.

15 Claims, 11 Drawing Sheets

10
34
52
14
32
50
30
20
54
72
12
16
74
70

14
132
136
134
138
12

12
ANTENNA & FRONT END
156
RF TRANSCEIVER
158
MICROPHONE
162
EARPIECE
164
HEADSET
166
ANALOG BASEBAND PROCESSING
150
DSP
152
MEMORY
154
CARD
170
USB
172
INFRARED
174
VIBRATOR
176
KEYPAD
178
I/O IFC
168
TOUCH SCREEN/ LCD CONTROLLER
182
CAMERA CONTROLLER
186
GPS
188
TOUCH SCREEN LCD
180
CCD CAMERA
184

WEB BROWSER
246
MEDIA PLAYER
248
JAVA APPLETS
250
APPLICATION MANAGEMENT SERVICES
244
OPERATING SYSTEM (DRIVERS)
242
240

LOCALIZED MOBILE DIGITAL TV

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile television (TV) generally refers to a group of services that deliver either real time or on demand digital multimedia content to mobile devices. Mobile TV allows viewers to enjoy personalized, interactive TV with content specifically adapted to the mobile medium. In addition to mobility, mobile TV delivers a variety of services including video-on-demand, traditional/linear and live TV programs.

Technically, there are currently two main mechanisms for delivering mobile TV. The first mechanism delivers mobile TV via a two-way cellular network, and the second mechanism delivers mobile TV through a one-way dedicated broadcast network. These mechanisms include digital video broadcasting-handheld (DVB-H), digital multimedia broadcasting (DMB), TDtv (based on TD-CDMA), 1seg (based on Japan's ISDB-T), DAB and MediaFLO.

SUMMARY

Systems and methods of transmitting multimedia data are disclosed herein, including a method of transmitting multimedia data comprising creating a first link between a first data source and a mobile device and a second link between a second data source and the mobile device and the mobile device receiving a first data stream through the first link and a second data stream through the second link. This method also comprises displaying the first data stream on the mobile device, creating transmission statistics related to the first link, and transmitting the transmission statistics over the second link. In addition, this method may further comprise transmitting a third data stream over the second link from the second data source to the mobile device and switching from displaying the first data stream on the mobile device to displaying the third data stream based upon the transmission statistics.

A system describing some of the disclosed embodiments comprises a mobile digital television transmitter transmitting a primary data stream, a transceiver transmitting a secondary data stream, and a mobile device. In some embodiments the mobile device comprises a mobile display, a mobile transceiver, and a mobile processor and receives at least the primary data stream and the secondary data stream. The mobile device displays data from either the primary data stream or the secondary data stream, and transmits a mobile data stream to the transceiver. The mobile data stream may comprise information relating to the status of both the primary data stream and the secondary data stream. This system may also include a server in communication with the transceiver, wherein the server is capable of determining the signal conditions of the mobile device based upon the mobile data stream and alter the secondary data stream based upon the mobile data stream.

In addition, a method of providing customized purchasing opportunities to wireless users is disclosed which comprises delivering multimedia content to a wireless device through a wireless transmission medium using a transmitter, transmitting information relating to the multimedia content displayed on the wireless device from the wireless device to a first transceiver, and determining the location of the wireless device. In addition, this method may comprise determining the content relevant to a wireless user based upon the location of the wireless device and the multimedia content displayed on the wireless device, transmitting customized purchasing opportunities to the wireless device, and displaying the customized purchasing opportunities on the wireless device.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although an illustrative implementation of one embodiment of the present disclosure is illustrated below, the present system may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

One of the challenges of delivering mobile content to handset users is providing a constant stream of data to a user. In traditional wireless content delivery systems, a single source transmits a single data stream to a user. For instance, a mobile television transmitter may transmit a single mobile television data stream to a user, but the signal from the source may be interrupted, deflected, or lost. In these cases, the signal from the mobile television transmitter may be disrupted rendering the mobile television data stream unavailable to the user. While the signal from the mobile television transmitter may be unavailable, the signal from another source, such as a cellular tower, may be available. Systems and methods which compensate for the loss of a signal from a source such as a mobile television transmitter by supplementing the signal from an alternative source such as a cellular network may provide a seamless method for providing multimedia content to a user. In addition, systems that combine information from multiple data sources, for instance the multimedia from a mobile television transmitter with the information derived from a cellular network, may provide specific information to a user about various consumer purchasing opportunities.

Figure 1:
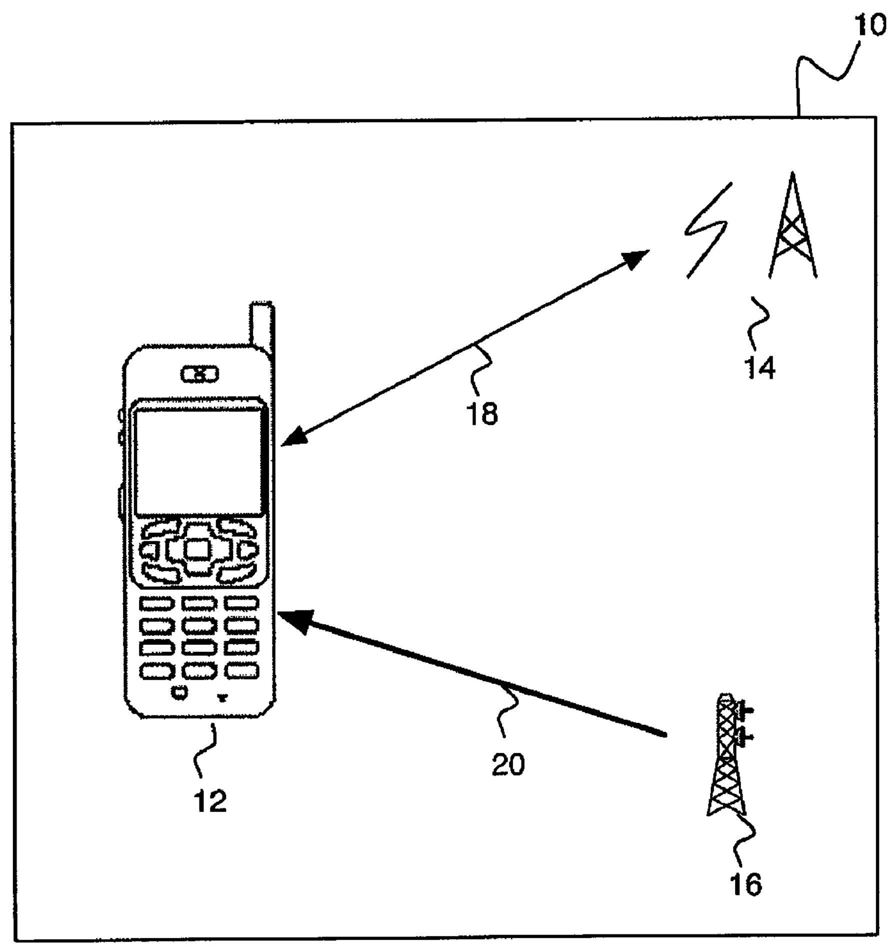
FIG. 1 illustrates a system for implementing a localized mobile digital TV application.

In a multimedia delivery system 10 illustrated by FIG. 1, a mobile device 12 is coupled to a first data source 14 through a first data link 18. in addition, the mobile device 12 is also coupled to a second data source 16 through a second data link 20. The first data link 18 is a bidirectional data link allowing mobile device 12 to send and receive information from the first data source 14. The second data link 20 may, in some embodiments, be provided by a transmitter which is not equipped to receive transmissions (e.g. a broadcast transmitter). In one embodiment, a signal may be transmitted from the second data source 16 through the second data link 20 and displayed on the mobile device 12. In this embodiment, information regarding the second data link 20 will be transmitted from the mobile device 12 to the first data source 14 through the first data link 18. This information may, in some embodiments, include transmission statistics relating to the second data link 20 and, in some embodiments, may be referred to as a mobile data stream. If the transmission statistics relating the relative quality of the second data link 20 falls below a threshold (e.g. the quality of the second data link 20 is insufficient to provide the mobile handset 12 adequate data to display the data from the second data source 16), the first data source 14 may compensate for the degraded quality of the second data link 20. This compensation may take the form of replacing the information being sent through the second data link 20, or providing error notification to the user with the mobile device 12.

While the use of the first data source 14 as a replacement for the second data source 16 is one advantage of the configuration disclosed in FIG. 1, there are several other advantages that are expressly contemplated by the present disclosure. Some of these include providing the mobile device 12 with additional data streams to chose from (e.g. additional multimedia content), alerting the mobile device 12 to changes in network conditions or providing public information, as well as providing the customer specific information regarding consumer purchasing opportunities. These examples are not exhaustive of the advantages offered by the presently disclosed systems and methods, and are described for the purpose of clarity.

The mobile device 12 is intended to refer to any device capable of receiving a wireless data signal, including, but not limited to, a mobile telephone, a personal digital assistant (PDA), a media player, or a mobile computer equipped with a wireless interface. It is expressly understood that any device can be the mobile device 12 so long as it is equipped with the ability to send and receive wireless information from the first data source 14 or receive wireless information from the second data source 16.

The first data source 14 may be any data source capable of sending and receiving wireless information to the mobile device 12. Examples of the first data source 14 include, but are not limited to, a base transceiver station, a wireless wide area network transceiver (WWAN, e.g. WiMAX, EV-DO), a wireless local area network (WLAN) transceiver, and satellite sources. The first data source 14 may receive information from the mobile device 12 and send information back to the mobile device 12 based upon the information received from the mobile device 12. The first data source 14 may operate on any frequency, and with any radio transmission technique known to one skilled in the art, including time domain modulation (TDM), frequency domain modulation (FDM), Orthogonal Frequency-Division Multiplexing (OFDM), or combination thereof. The first data source 14 may determine, in some embodiments, whether the mobile device 12 displays a data stream from the first data source 14 or the second data source 16. In other embodiments, the first data source 14 may provide the user with the option to select what source the mobile device 12 displays data from.

The second data source 16 may also be any data source capable of sending wireless information to the mobile device 12. Examples of the second data source 16 include, but are not limited to, a television transmitter, a unicast transmitter, a mobile television transmitter, and transceiver devices such as a base transceiver station, a wireless wide area network (WWAN), a wireless local area network (WLAN), and satellite sources. The second data source 16 is illustrated as a transmitter rather than a transceiver for the purpose of clarity. However, the second data source 16, in some embodiments, may be a transceiver instead of a transmitter. The second data source 16 may operate on any frequency and with any radio transmission technique known to one skilled in the art, including time domain modulation (TDM), frequency domain modulation (FDM), Orthogonal Frequency-Division Multiplexing (OFDM), or combination thereof.

As is known to one skilled in the art, the phrase "transmission statistics" may encompass a wide variety of information regarding a data link. This information may include, but is not limited to, the strength of the signal, the number of packets transmitted in a particular time (or speed of the connection), the number of errors in transmission, the number of dropped or "missing" packets, information corresponding to the data stream displayed on the mobile device 12 (e.g. the channel being watched), information allowing for the determination of the location of mobile device 12, and the source and destination of the packets. A packet is a term used to quantify some amount of data being transmitted. Transmission statistics may be collected and aggregated by the first data source 14 in either real time (e.g. at time intervals of about 150 microseconds or less) and/or at a longer predetermined interval (e.g. at time intervals longer than about 150 us). Transmissions statistics also may be collected and aggregated by the first data source 14 upon events occurring on the mobile device 12, including, but not limited to, the changing of a channel viewed on the mobile device 12 or the changing of the condition of the second data link 20. It is understood that the transmission statistics may also represent the physical parameters of the signal propagation including, but not limited to a synchronization signal, a pilot to carrier signal phase measurement, a pilot to carrier noise signal, a frequency offset measurement, a frequency stability measurement, an in-bound signaling measurement, and an out-of-transmission signal measurement, or a combination thereof, for example. The data transmitted from the mobile device 12 may be referred to, in some embodiments, as a mobile data stream.

It is further explicitly understood that the transmission statistics may be associated with the location of the mobile device 12 by sending the transmission statistics in any way known to one skilled in the art from the mobile device 12 to the first data source 14. These methods include, but are not limited to, using multiple base station units to triangulate the location of the mobile device 12. Broadcasters, such as mobile digital television transmitters, typically do not receive feedback in the form of transmission statistics. Mobile digital television transmitters could use transmission statistics to improve broadcasts, predict trouble locations, or predict other problems. Mobile digital television transmitters can be provided this information by transferring information from the first data source 14 to the second data source 16. Using this information, the mobile digital television transmitter, in some embodiments represented by the second data source 16, can send information through either the first data source 14 or the second data source 16 to the mobile device 12 instructing mobile device 12 to switch displaying data from the second data source 16 to the first data source 14 for any reason known to one skilled in the art. These reasons include, but are not limited to, a potential loss of signal to the mobile device 12 from the second data source 16. Moreover, these instructions may also include determining when mobile device 12 should switch back to displaying data from the second data source 16 when the signal from the second data source 16 has returned. This information may, in some embodiments, allow first data source 14 to selectively send data that is synchronized with the data being transmitted from the second data source 16 to the mobile device 12 at times when mobile device 12 may experience problems.

Figure 2:
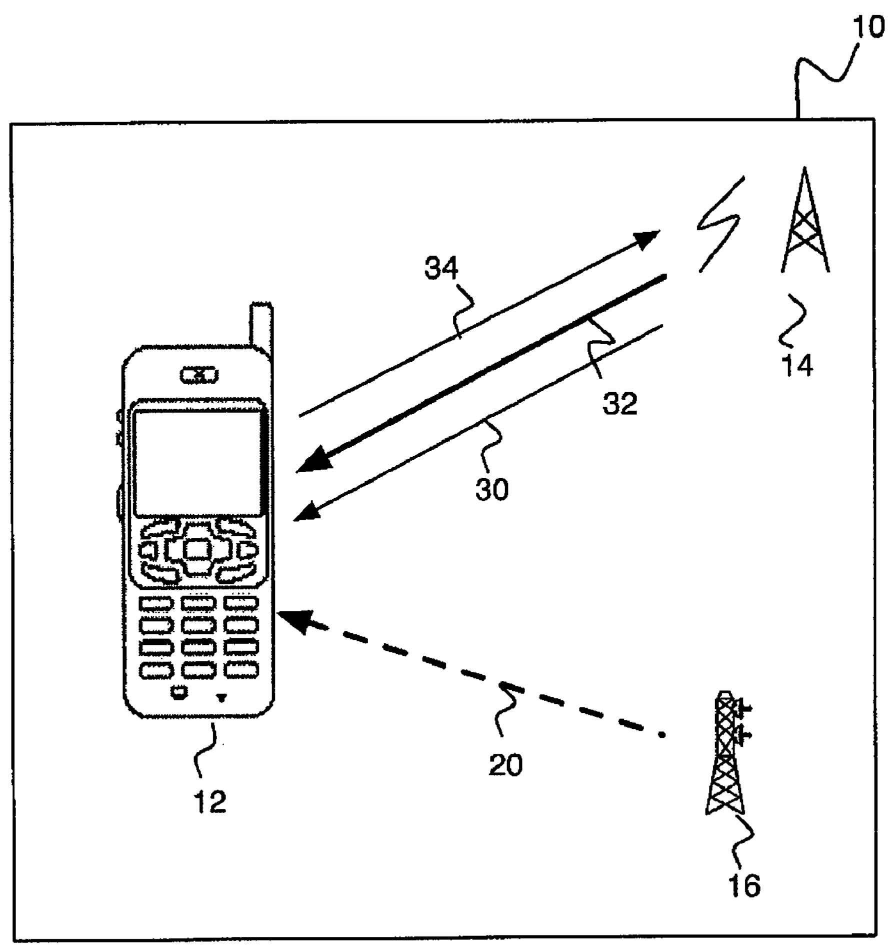
FIG. 2 illustrates a system for implementing the localized mobile digital TV application with multiple connections.

FIG. 2 is an expansion of the multimedia delivery system 10 illustrated by FIG. 1 with the first data link 18 being replaced by a mobile data transmitter data link 34, a first transmission data link 32 and a second transmission data link 30. In this example, the second data link 20 has become interrupted, as shown by the broken link from the second data source 16 to the mobile device 12. In this case, the first data source 14 becomes aware of the problem through the transmission information sent through the mobile data transmitter data link 34. The first data source 14 then has the option to send using one, or both, of the first transmission data link 32 and the second transmission data link 30. The first transmission data link 32, may, in some embodiments, be a multimedia transmission intended to replace the transmission from the second data source 16. The first transmission data link 32 is indicated as darker because in order for first data source 14 to transmit multimedia data from the first data source 14 to the mobile device 12, more bandwidth is required than would be required if only error messages or notifications were being transmitted. The second transmission data link 30 is an example of a data link where only an error message may be transmitted or other information regarding the data interruption. Examples of where the second transmission data link 30 may be used include, but are not limited to, alerting the user to network conditions (such as network congestion, temporary outages, etc.), alerting the user to emergency conditions or notices by authorities, or alerting the user to changes in the status of the second data source 16.

Figure 3:
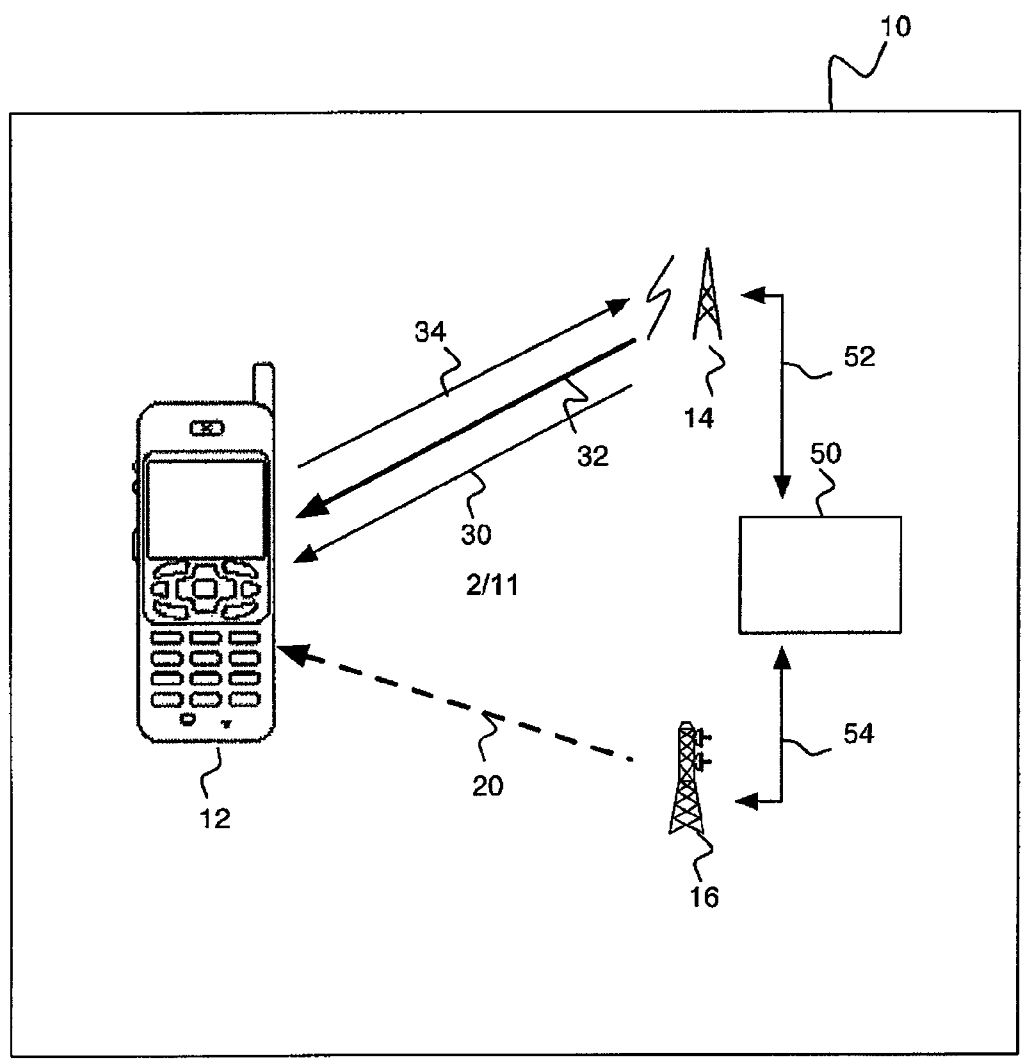
FIG. 3 illustrates a system for implementing the localized mobile digital TV application using a server.

FIG. 3 is an illustration of the multimedia delivery system 10 wherein the first data source 14 and the second data source 16 are configured to communicate with each other. In this embodiment first the data source 14 communicates with a server 50 through a first network connection 52 and the second data source 16 communicates with the server 50 through a second network connection 54. It is expressly understood that the first network connection 52 and the second network connection 54 may be connected to the server 50 through a wired, wireless, or combination of wired and wireless networks as known to one skilled in the art. Through this connection, the server 50 is aware of the operational status and transmission statistics of the first data source 14 and the second data source 16.

One of the features disclosed by the embodiment illustrated by FIG. 3 is the ability for different data sources to exchange information through a computer network. In the case of an interruption of the data stream from the second data source 16, the first data source 14 can obtain the data stream from the second data source 16 and transmit the data stream, or a representation of the data stream. This prevents the interruption of service to the mobile device 12.

In addition, when the data stream from the second data source 16 is not interrupted, if the first data source 14 is aware of the content being transmitted by the second data source 16, the first data source 14 can customize consumer purchasing opportunities to the mobile device 12. For instance, first data source 14 may be aware of the relative location of the mobile device 12 based upon transmission statistics, triangulation with other data sources, or through other methods known to one skilled in the art. This awareness of the location of the mobile device 12 combined with information relating the content being displayed on the mobile device 12 permits the customization of purchasing opportunities near to the mobile device 12. For example, if the mobile device 12 is displaying a television show discussing a current consumer product, the first data source 14 might send a message to the mobile device 12 describing where to purchase the product near the current location of mobile device 12. It is expressly understood that while a single mobile device 12 is illustrated in this exemplary embodiment, multiple devices could be used in accordance with the present disclosure.

Figure 4:
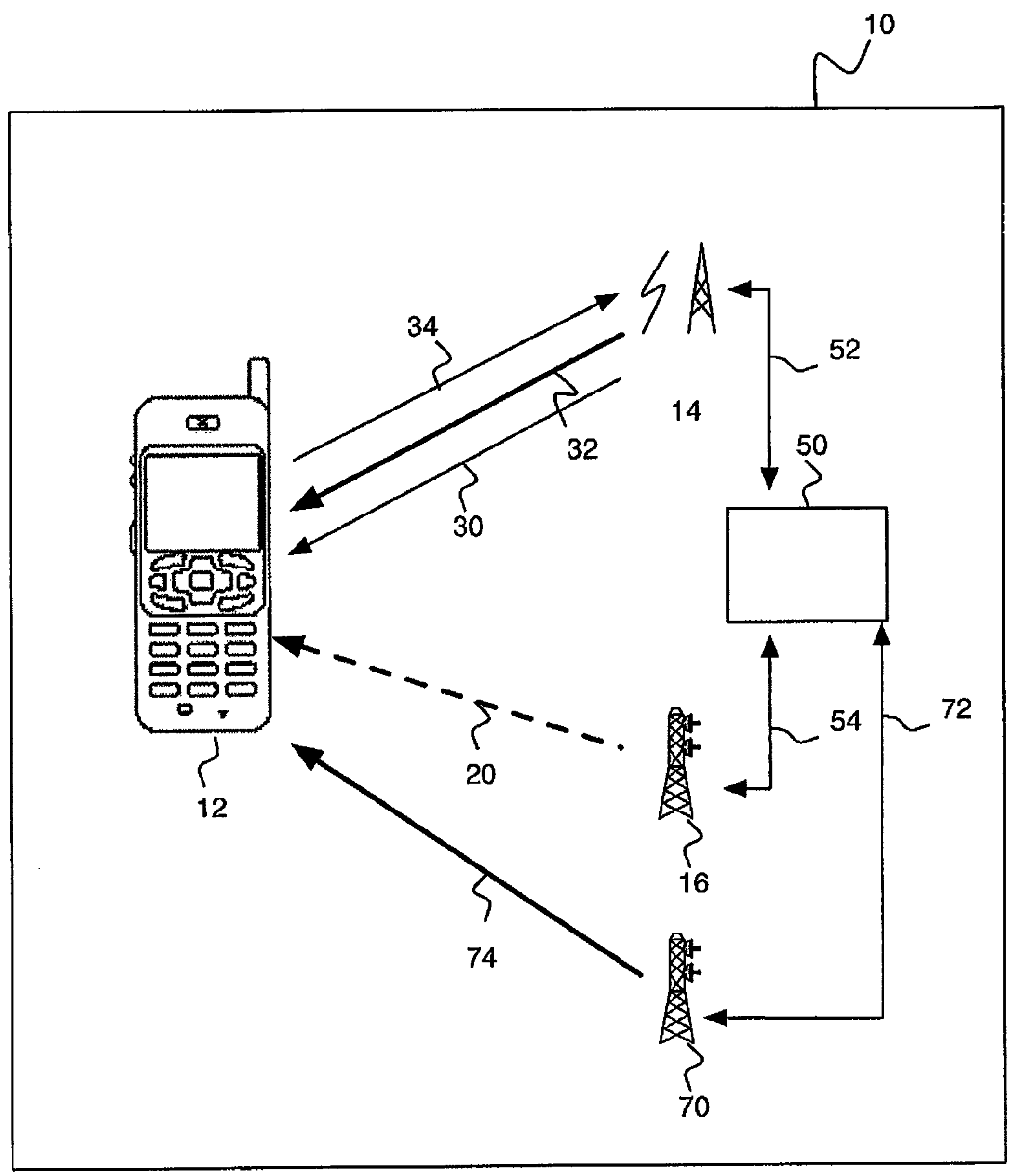
FIG. 4 illustrates a system for implementing the localized mobile digital TV application with three data sources.

Another of the innovative elements of the present disclosure is the ability to direct alternative sources of information through dissimilar transmission techniques to the mobile device 12. FIG. 4 is an example of where an additional data source is used to transmit information to the mobile device 12. In this example, a third data source 70 communicates with the server 50 through a third network connection 72. The third data source 70 is also connected to the mobile device 12 through a third data link 74. The third network connection 72 is similar to the first network connection 52 and second network connection 54. The third data link 74 is similar to the second data link 20 and the first data link 18.

FIG. 4 is intended to illustrate that the mobile device 12 may receive a compensating data stream directed from the first data source 14 from a location other than the first data source 14. In this example, the second data link 20 is insufficient to provide enough data for the mobile device 12. This insufficient data may be a result of the mobile device 12 being unable to receive a signal through data link 20. The mobile device 12 notifies the first data source 14 that it is not receiving sufficient data from the second data source 16. The first data source 14 contacts the third data source 70 and uses the third data source 70 with the third data link 74 to transmit the data from the second data source 16 to the mobile device 12. This example is intended to illustrate that the first data source 14 cannot only transmit data itself, but can also reroute data through a separate transmitter.

Figure 5:
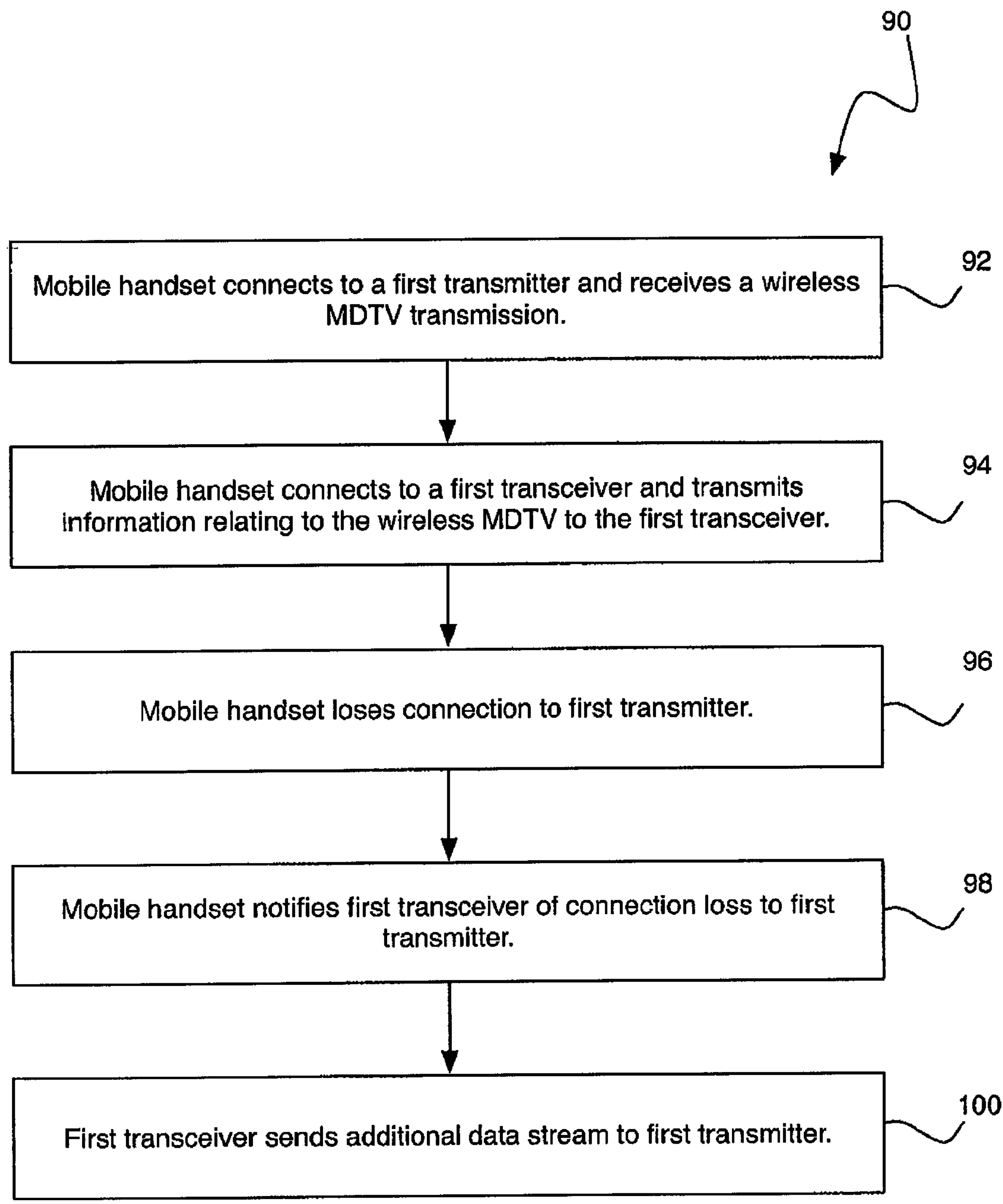
FIG. 5 illustrates a method of implementing the localized mobile digital TV application.
Figure 6:
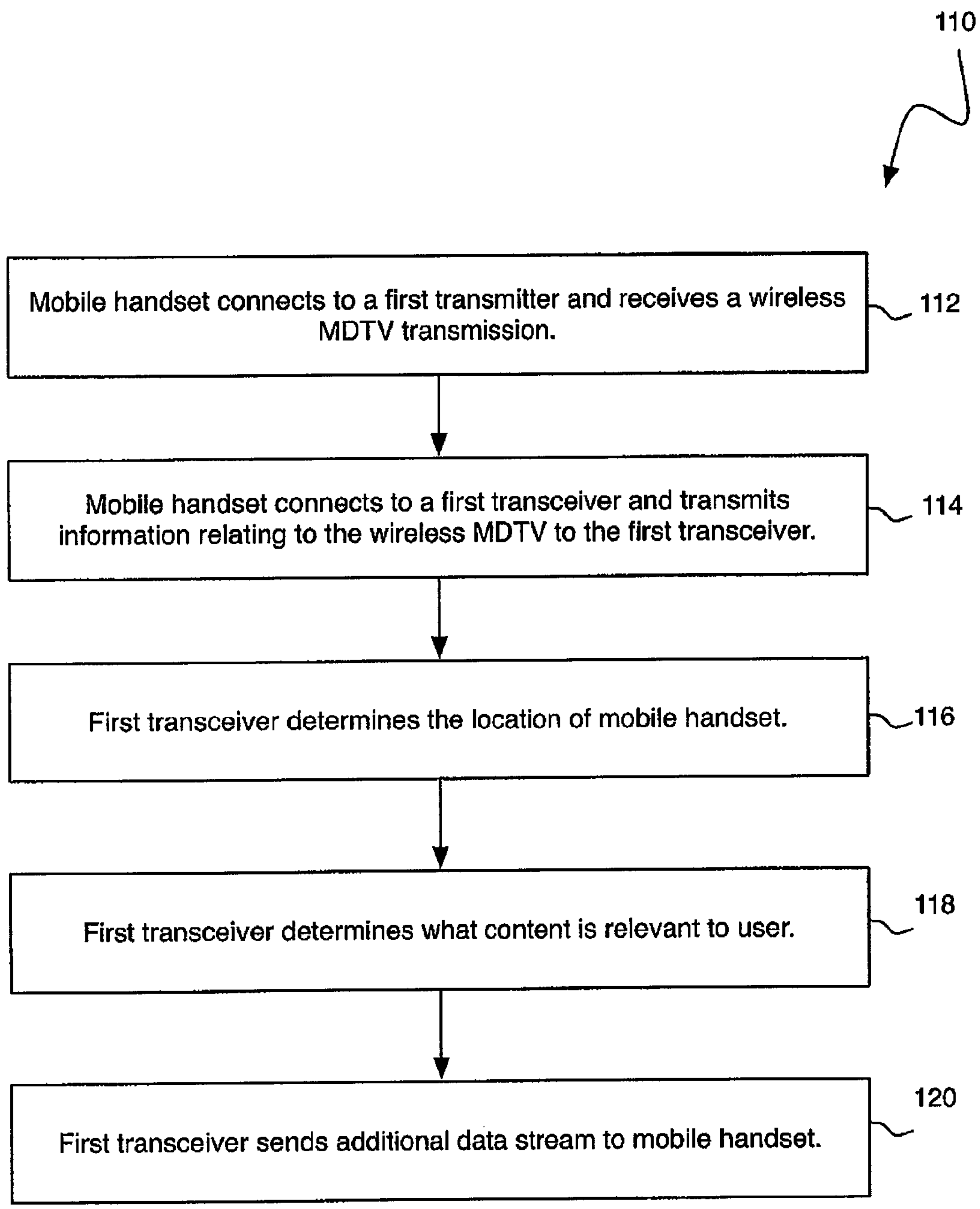
FIG. 6 illustrates another method of implementing the localized mobile digital TV application.

FIG. 5 and FIG. 6 illustrate two exemplary methods of implementing the disclosed systems and methods. FIG. 5 illustrates a method 90 of compensating for a loss of signal to mobile device 12 from second data source 16. FIG. 6 illustrates a method 110 whereby the first data source 14 uses information from the second data source 16 to provide the consumer with customized purchasing opportunities.

In FIG. 5, an additional data stream is provided to the mobile device 12, wherein the mobile device 12 is referred to as a mobile handset. In the method 90, as shown in block 92, the mobile handset connects to a first transmitter and receives a wireless mobile digital television (MDTV) transmission. In block 94, the mobile handset connects to a first transceiver and transmits information relating to the wireless MDTV to the first transceiver. In block 96, the mobile handset loses connection to first transmitter. In block 98, the mobile handset notifies the first transceiver of connection loss or other problem in receiving data from the first transmitter by the first transceiver. In block 100, the first transceiver sends additional data stream to first transmitter.

It is explicitly understood that one or more additional data streams may be synced to a data source, such as a MDTV transmitter or the second data source 16. Depending on the latencies and service goals, the mobile device 12 may receive data streams from a plurality of sources, including the first data source 14 and the second data source 16. In addition, it is further expressly contemplated that this plurality of sources may selectively send data to the mobile device 12 based upon transmission statistics, network conditions, or for any other reason known to one skilled in the art.

In FIG. 6, a customized purchasing opportunity is presented to a user based upon the localized MDTV content through method 110. As in FIG. 5, the mobile device will be described in terms of a mobile handset. In block 112, the mobile handset connects to a first transmitter and receives a wireless MDTV transmission. In block 114, the mobile handset connects to a first transceiver and transmits information relating to the wireless MDTV to the first transceiver. In block 116, first transceiver determines the location of the mobile handset. In block 118, first transceiver determines content that is relevant to user. In block 120, first transceiver sends additional data stream to the mobile handset. The additional data stream may be sales that relate to products relevant to the user, location of where products relevant to the user may be purchased near to user, or additional information related to products relevant to the user.

Figure 7:
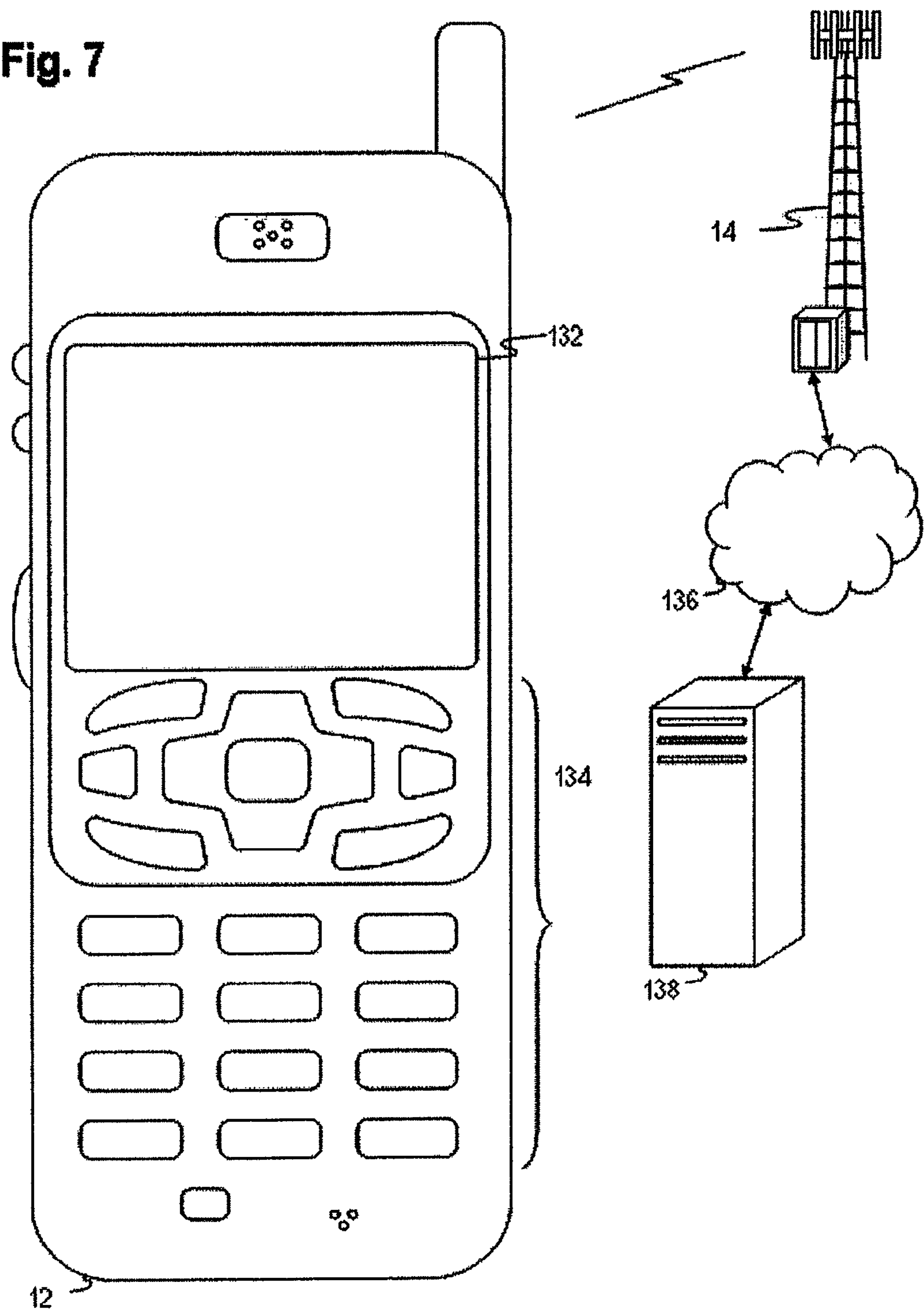
FIG. 7 illustrates an exemplary handset suitable for implementing the several embodiments of the disclosure.

FIG. 7 depicts the mobile device 12, which is operable for implementing aspects of the present disclosure, but the present disclosure should not be limited to these implementations. Though illustrated as a mobile phone, the mobile device 12 may take various forms including a wireless handset, a pager, a personal digital assistant (PDA), a portable computer, a tablet computer, or a laptop computer. Many suitable handsets combine some or all of these functions. In some embodiments of the present disclosure, the mobile device 12 is not a general purpose computing device like a portable, laptop or tablet computer, but rather is a special-purpose communications device such as a mobile phone, wireless handset, pager, or PDA. The mobile device 12 may support specialized activities such as gaming, inventory control, job control, and/or task management functions, and so on.

The mobile device 12 includes a screen 132 and a touch-sensitive surface or keys 134 for input by a user. The mobile device 12 may present options for the user to select, controls for the user to actuate, and/or cursors or other indicators for the user to direct. The mobile device 12 may further accept data entry from the user, including numbers to dial or various parameter values for configuring the operation of the handset. The mobile device 12 may further execute one or more software or firmware applications in response to user commands. These applications may configure the mobile device 12 to perform various customized functions in response to user interaction. Additionally, the mobile device 12 may be programmed and/or configured over-the-air, for example from a wireless base station, a wireless access point, or a peer mobile device 12.

The mobile device 12 may execute a web browser application which enables the screen 132 to show a web page. The web page may be obtained via wireless communications with a first data source 14, a wireless network access node, a peer handset or any other wireless communication network or system. The first data source 14 (or wireless network access node) is coupled to a wired network 136, such as the Internet. Via the wireless link and the wired network, the mobile device 12 has access to information on various servers, such as a server 138. The server 138 may provide content that may be shown on the screen 132. Alternately, the mobile device 12 may access the first data source 14 through the mobile device 12 acting as an intermediary, in a relay type or hop type of connection.

Figure 8:
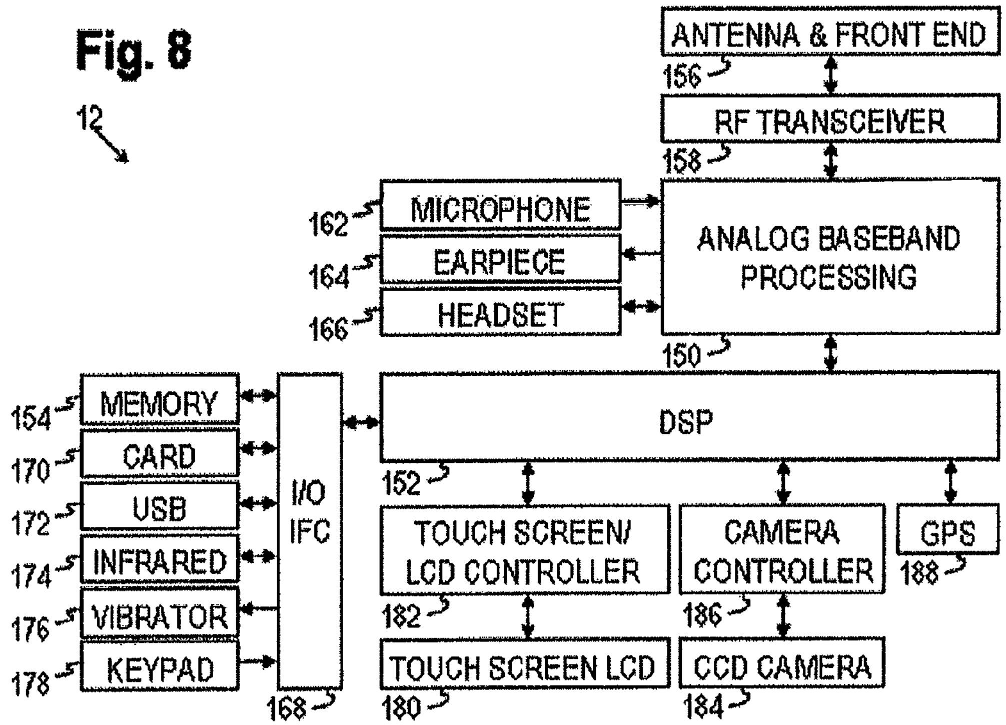
FIG. 8 is a block diagram of a handset suitable for implementing the several embodiments of the disclosure.

FIG. 8 shows a block diagram of the mobile device 12. While a variety of known components of mobile device 12 are depicted, in an embodiment a subset of the listed components and/or additional components not listed may be included in the mobile device 12. The mobile device 12 includes a digital signal processor (DSP) 152 and a memory 154. As shown, the mobile device 12 may further include an antenna and a front end unit 156, a radio frequency (RF) transceiver 158, an analog baseband processing unit 150, a microphone 162, an earpiece speaker 164, a headset port 166, an input/output interface 168, a removable memory card 170, a universal serial bus (USB) interface 172, an infrared port 174, a vibrator 176, a keypad 178, a touch screen liquid crystal display (LCD) with a touch sensitive surface screen 180, a touch screen/LCD controller 182, a charge-coupled device (CCD) camera 184, a camera controller 186, and a global positioning system (GPS) sensor 188. In an embodiment, the mobile device 12 may include another kind of display that does not provide a touch sensitive screen. In an embodiment, the DSP 152 may communicate directly with the memory 154 without passing through the input/output interface 168.

The DSP 152 or some other form of controller or central processing unit operates to control the various components of the mobile device 12 in accordance with embedded software or firmware stored in memory 154 or stored in memory contained within the DSP 152 itself. In addition to the embedded software or firmware, the DSP 152 may execute other applications stored in the memory 154 or made available via information carrier media such as portable data storage media like the removable memory card 170 or via wired or wireless network communications. The application software may comprise a compiled set of machine-readable instructions that configure the DSP 152 to provide the desired functionality, or the application software may be high-level software instructions to be processed by an interpreter or compiler to indirectly configure the DSP 152.

The antenna and front end unit 156 may be provided to convert between wireless signals and electrical signals, enabling the mobile device 12 to send and receive information from a cellular network or some other available wireless communications network or from a peer handset. In an embodiment, the antenna and front end unit 156 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 156 may include antenna tuning and/or impedance matching components, RF power amplifiers, and/or low noise amplifiers.

The RF transceiver 158 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 150 and/or the DSP 152 or other central processing unit. In some embodiments, the RF transceiver 158, portions of the antenna and front end unit 156, and the analog baseband processing unit 150 may be combined in one or more processing units and/or application specific integrated circuits (ASICs).

The analog baseband processing unit 150 may provide various analog processing of inputs and outputs, for example analog processing of inputs from the microphone 162 and the headset port 166 and outputs to the earpiece speaker 164 and the headset port 166. To that end, the analog baseband processing unit 150 may have ports for connecting to the built-in microphone 162 and the earpiece speaker 164 that enable the mobile device 12 to be used as a cell phone. The analog baseband processing unit 150 may further include a port for connecting to a headset or other hands-free microphone and speaker configuration. The analog baseband processing unit 150 may provide digital-to-analog conversion in one signal direction and analog-to-digital conversion in the opposing signal direction. In some embodiments, at least some of the functionality of the analog baseband processing unit 150 may be provided by digital processing components, for example by the DSP 152 or by other central processing units.

The DSP 152 may perform modulation/demodulation, coding/decoding, interleaving/deinterleaving, spreading/despreading, inverse fast fourier transforming (IFFT)/fast fourier transforming (FFT), cyclic prefix appending/removal, and other signal processing functions associated with wireless communications. In an embodiment, for example in a code division multiple access (CDMA) technology application, for a transmitter function the DSP 152 may perform modulation, coding, interleaving, and spreading, and for a receiver function the DSP 152 may perform despreading, deinterleaving, decoding, and demodulation. In another embodiment, for example in an orthogonal frequency division multiplex access (OFDMA) technology application, for the transmitter function the DSP 152 may perform modulation, coding, interleaving, inverse fast fourier transforming, and cyclic prefix appending, and for a receiver function the DSP 152 may perform cyclic prefix removal, fast fourier transforming, deinterleaving, decoding, and demodulation. In other wireless technology applications, yet other signal processing functions and combinations of signal processing functions may be performed by the DSP 152.

The DSP 152 may communicate with a wireless network via the analog baseband processing unit 150. In some embodiments, the communication may provide Internet connectivity, enabling a user to gain access to content on the Internet and to send and receive e-mail or text messages. The input/output interface 168 interconnects the DSP 152 and various memories and interfaces. The memory 154 and the removable memory card 170 may provide software and data to configure the operation of the DSP 152. Among the interfaces may be the USB interface 172 and the infrared port 174. The USB interface 172 may enable the mobile device 12 to function as a peripheral device to exchange information with a personal computer or other computer system. The infrared port 174 and other optional ports such as a Bluetooth interface or an IEEE 802.11 compliant wireless interface may enable the mobile device 12 to communicate wirelessly with other nearby handsets and/or wireless base stations.

The input/output interface 168 may further connect the DSP 152 to the vibrator 176 that, when triggered, causes the mobile device 12 to vibrate. The vibrator 176 may serve as a mechanism for silently alerting the user to any of various events such as an incoming call, a new text message, and an appointment reminder.

The keypad 178 couples to the DSP 152 via the input/output interface 168 to provide one mechanism for the user to make selections, enter information, and otherwise provide input to the mobile device 12. Another input mechanism may be the touch LCD screen 180, which may also display text and/or graphics to the user. The touch screen LCD controller 182 couples the DSP 152 to the touch LCD screen 180.

The CCD camera 184 enables the mobile device 12 to take digital pictures. The DSP 152 communicates with the CCD camera 184 via the camera controller 186. The GPS sensor 188 is coupled to the DSP 152 to decode global positioning system signals, thereby enabling the mobile device 12 to determine its position. In another embodiment, a camera operating according to a technology other than Charge Coupled Device cameras may be employed. Various other peripherals may also be included to provide additional functions, e.g., radio and television reception.

Figure 9:
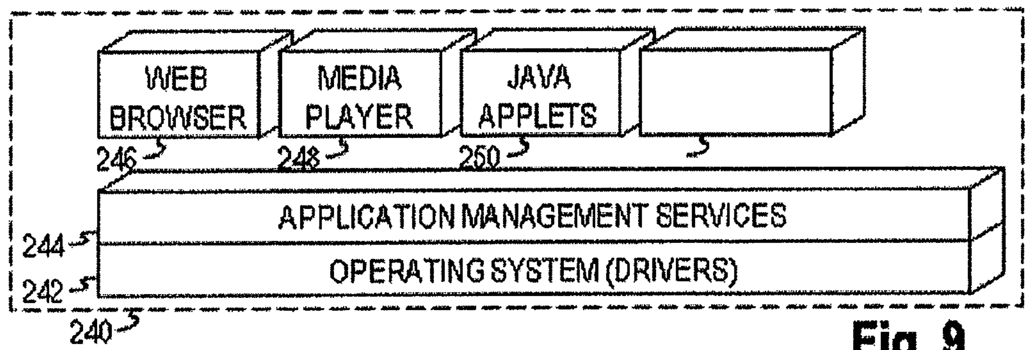
FIG. 9 illustrates a software environment that may be implemented by the handset.

FIG. 9 illustrates a software environment 240 that may be implemented by the DSP 152. The DSP 152 executes operating system drivers 242 that provide a platform from which the rest of the software operates. The operating system drivers 242 provide drivers for the handset hardware with standardized interfaces that are accessible to application software. The operating system drivers 242 include application management services ("AMS") 244 that transfer control between applications running on the mobile device 12. Also shown in FIG. 9 are a web browser application 246, a media player application 248, and JAVA applets 250. The web browser application 246 configures the mobile device 12 to operate as a web browser, allowing a user to enter information into forms and select links to retrieve and view web pages. The media player application 248 configures the mobile device 12 to retrieve and play audio or audiovisual media. The JAVA applets 250 configure the mobile device 12 to provide games, utilities, and other functionality.

The image that is displayed on the screen 132 on the mobile device 12 may vary on the basis of network conditions, the purpose of the information to be displayed (e.g., entertainment, message, advertising, etc.), or for any other reason as known to one skilled in the art. FIG. 10 is a set of four examples illustrating different configurations of the use of the first and second data stream for displaying images on the screen 132. For the purpose of clarity, in each example illustrated by FIG. 10, the area of screen 132 that is used by the second data source is shown by box 198. In each example, it is assumed that the entire area of the screen 132 will be used by the first data source 14. The X-axis and Y-axis are intended to show the relative position of the box 198 on the screen 132.

Figure 10A:
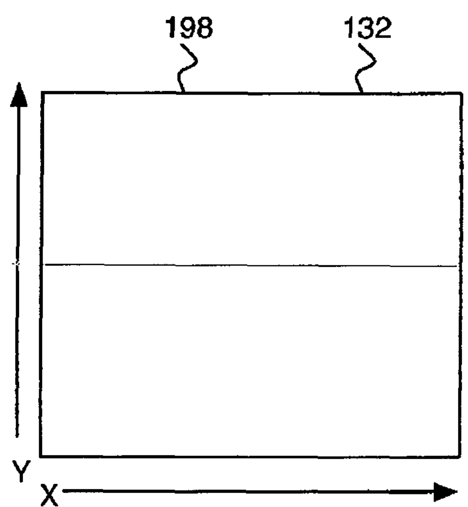
FIG. 10A illustrates a screen that displays a first and second data stream where the first and second data streams are the same size.

In the example shown by FIG. 10A, the screen 132 and the box 198 are the same size. This embodiment may be preferable when the first data stream is intended to be used instead of the second data stream. In this embodiment, the first data stream completely replaces the second data stream. Unlike the previous examples, in this example, both the first and second data sources are capable of sending and receiving information from mobile device 12.

Figure 10B:
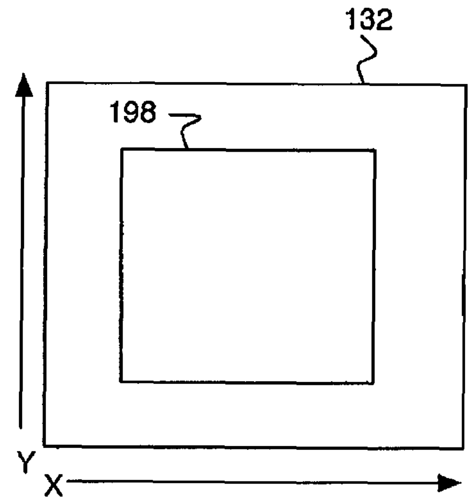
FIG. 10B illustrates a screen that displays a first and second data stream where the second data stream is smaller than the first data stream.

FIG. 10B illustrates the embodiment where the box 198 is smaller than the screen 132. This embodiment may be used when the first data stream becomes unavailable or degraded and the second data stream is used to either replace it, or where the first data stream is used to supplement the second data stream. In this embodiment, the second data stream may be smaller than the first data stream.

Figure 10C:
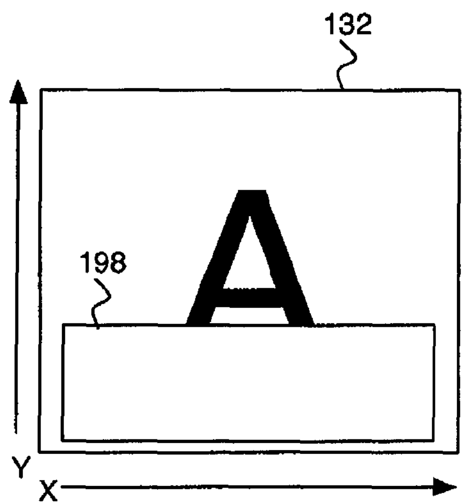
FIG. 10C illustrates a screen that displays a first and second data stream where the second data stream is smaller than the first data stream and oriented horizontally.

FIG. 10C illustrates the second data stream as smaller than the first data stream and orientated vertically, therefore the box 198 is smaller than the screen 132. This embodiment may be used to advertise a particular purchasing opportunity or deliver a message to a user viewing the first data stream. This embodiment may also be used to notify the user of a network condition or other message delivered by first data source 14. In this embodiment, the box 198 is solid and blocks the image shown by first data source on the screen 132, and the box 198 is on top of screen 132.

Figure 10D:
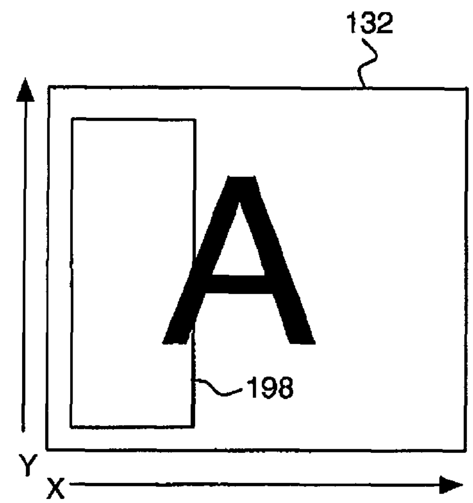
FIG. 10D illustrates a screen that displays a first and second data stream where the second data stream is smaller than the first data stream and oriented vertically.

FIG. 10D illustrates the second data stream as smaller than the first data stream and orientated horizontally, therefore the box 198 is smaller than the screen 132. This embodiment may also be used to advertise a particular purchasing opportunity or deliver a message directed to a user viewing the first data stream. This embodiment may also be used to notify the user of a network condition or other message delivered by a data source. In this embodiment, the box 198 is transparent and does not block the image shown by first data source on the screen 132.

Figure 11:
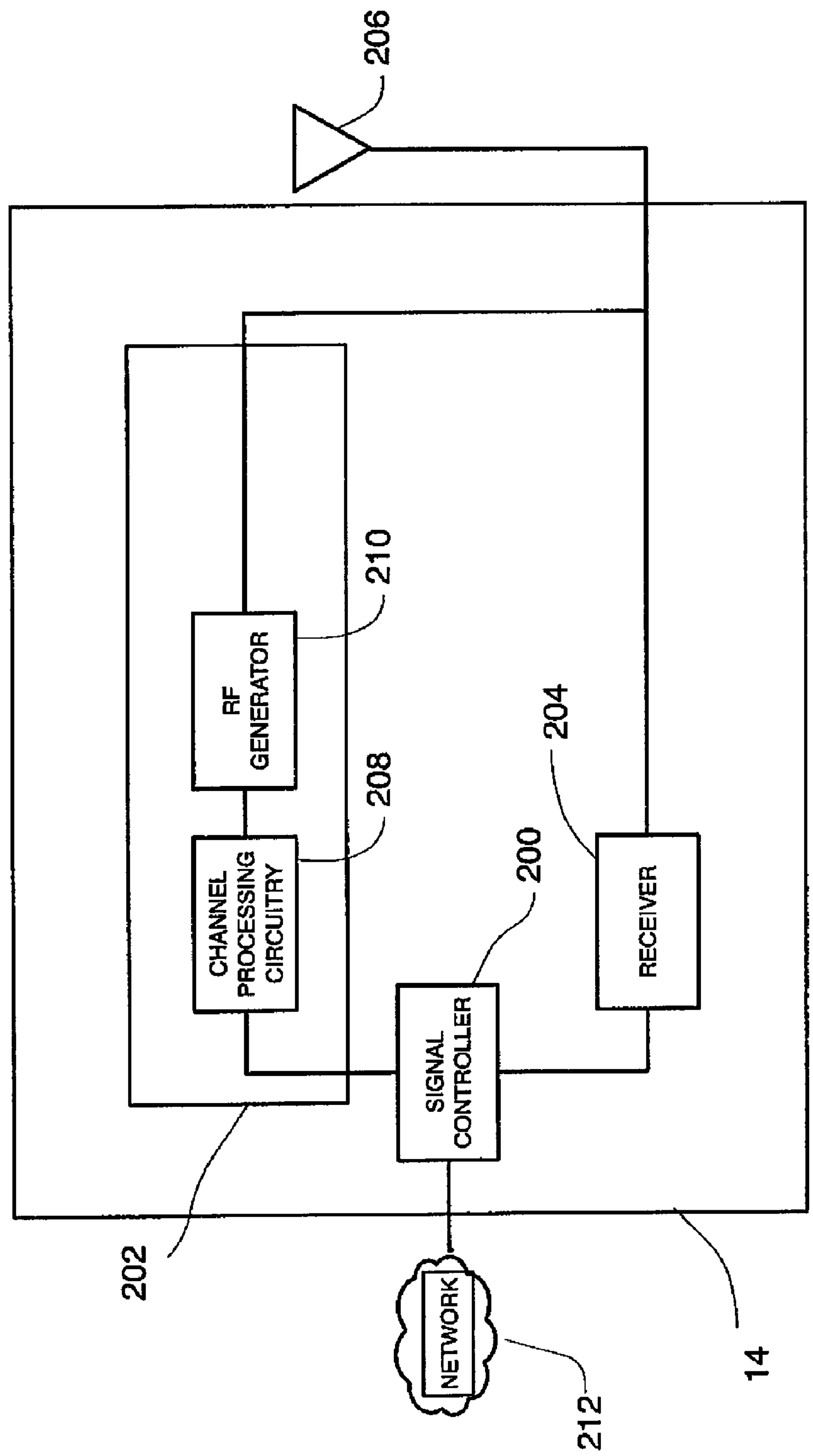
FIG. 11 is a block diagram of a base transceiver station.

FIG. 11 illustrates one embodiment of first data source 14 embodied as a base transceiver station that can be used with the disclosed systems. In this embodiment, the first data source 14 is a medium to high-power multi-channel, two-way radio in a fixed location. Typically it may be used by low-power, single-channel, two-way radios or wireless devices such as mobile phones, portable phones and wireless routers. The first data source 14 may comprise a signal controller 200 that is coupled to a transmitter 202 and a receiver 204. Transmitter 202 and receiver 204 (or combined transceiver) is further coupled to an antenna 206. In the first data source 14, digital signals are processed in signal controller 200. The digital signals may be signals for a wireless communication system, such as signals that convey voice or data intended for a mobile terminal (not shown). First data source 14 may employ any suitable wireless technologies or standards such as 2G, 2.5G, 3G, GSM, IMT-2000, UMTS, iDEN, GPRS, 1xEV-DO, EDGE, DECT, PDC, TDMA, FDMA, CDMA, W-CDMA, LTE, TD-CDMA, TD-SCDMA, GMSK, OFDM, WiMAX, the family of IEEE 802.11 standards, the family of IEEE 802.16 standards, IEEE 802.20, etc. Signal controller 200 then transmits the digital signals to transmitter 202, which includes a channel processing circuitry 208. Channel processing circuitry 208 encodes each digital signal, and a radio frequency (RF) generator 210 modulates the encoded signals onto an RF signal. The resulting output signal is transmitted over antenna 206 to the mobile terminal. Antenna 206 also receives signals sent to first data source 14 from the mobile terminal. Antenna 206 transmits the signals to receiver 204 that demodulates them into digital signals and transmits them to signal controller 200 where they may be relayed to an external network 212. First data source 14 may also comprise auxiliary equipment such as cooling fans or air exchangers for the removal of heat from first data source 14.

Figure 12:
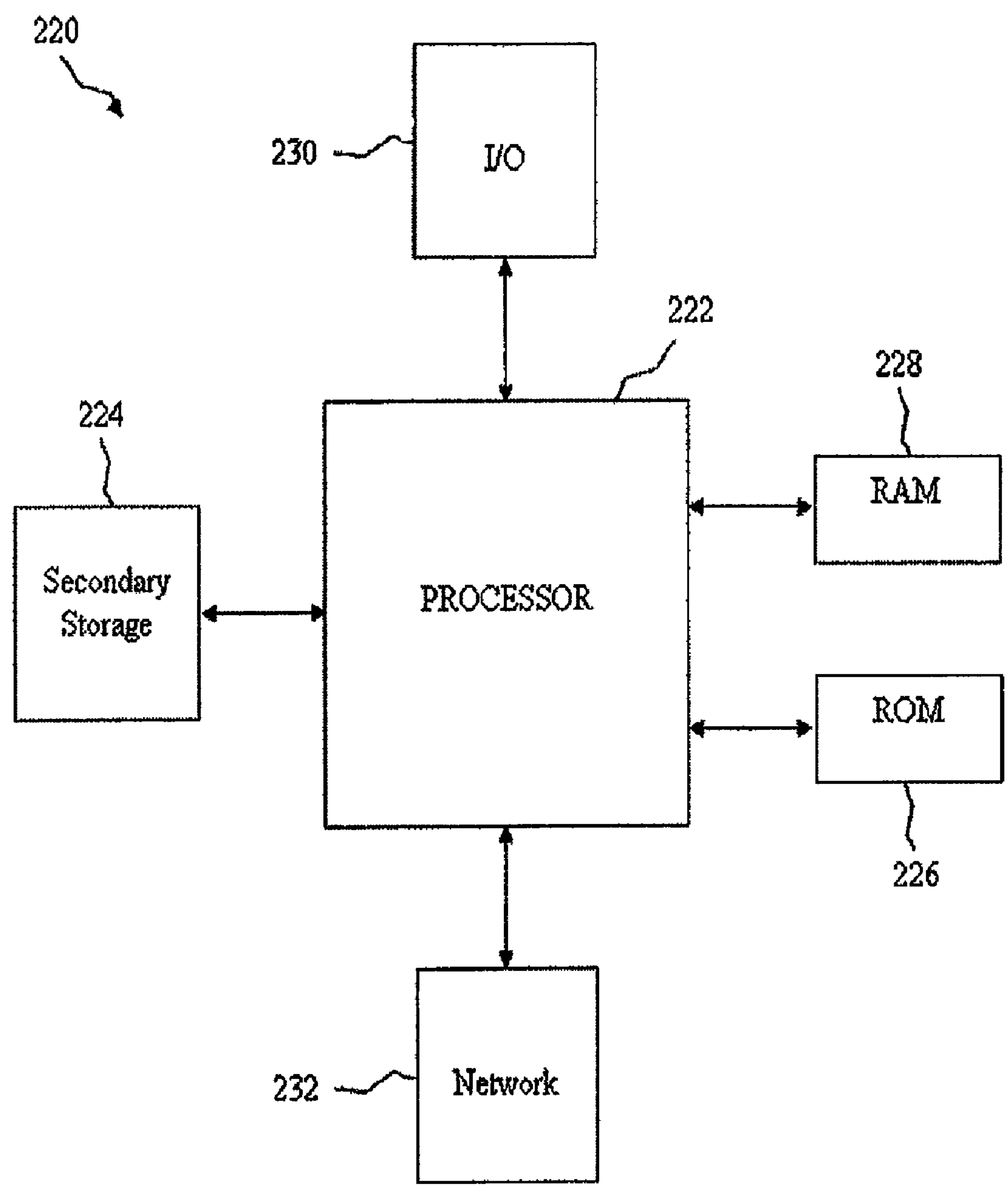
FIG. 12 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 12 illustrates a typical, general-purpose computer system suitable for implementing one or more embodiments disclosed herein. The computer system 220 includes a processor 222 (which may be referred to as a central processor unit or CPU) that is in communication with memory devices including secondary storage 224, read only memory (ROM) 226, random access memory (RAM) 228, input/output (I/O) devices 230, and network connectivity devices 232. The processor may be implemented as one or more CPU chips.

The secondary storage 224 is typically comprised of one or more disk drives or tape drives and is used for non-volatile storage of data and as an over-flow data storage device if RAM 228 is not large enough to hold all working data. Secondary storage 224 may be used to store programs which are loaded into RAM 228 when such programs are selected for execution. The ROM 226 is used to store instructions and perhaps data which are read during program execution. ROM 226 is a non-volatile memory device which typically has a small memory capacity relative to the larger memory capacity of secondary storage. The RAM 228 is used to store volatile data and perhaps to store instructions. Access to both ROM 226 and RAM 228 is typically faster than to secondary storage 224.

I/O devices 230 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 232 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity device 232 may enable the processor 222 to communicate with an Internet or one or more intranets. With such a network connection, it is contemplated that the processor 222 might receive information from the network, or might output information to the network in the course of performing the above-described method steps. Such information, which is often represented as a sequence of instructions to be executed using processor 222, may be received from and outputted to the network, for example, in the form of a computer data signal embodied in a carrier wave Such information, which may include data or instructions to be executed using processor 222 for example, may be received from and outputted to the network, for example, in the form of a computer data baseband signal or signal embodied in a carrier wave. The baseband signal or signal embodied in the carrier wave generated by the network connectivity devices 232 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 222 executes instructions, codes, computer programs, scripts which it accesses from hard disk, floppy disk, optical disk (these various disk based systems may all be considered secondary storage 224), ROM 226, RAM 228, or the network connectivity devices 232. While only one processor 222 is shown, multiple processors may be present. Thus, while instructions may be discussed as executed by a processor, the instructions may be executed simultaneously, serially, or otherwise executed by one or multiple processors.

While preferred embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosed embodiments herein presented are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of broader terms such as "comprises", "includes", "having", etc. should be understood to provide support for narrower terms such as "consisting of", "consisting essentially of", "comprised substantially of", etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the preferred embodiments of the present disclosure.

What is claimed is:

1. A method of transmitting multimedia data, comprising:

creating a first link between a first data source and a mobile device and a second link between a second data source and the mobile device, wherein the second data source is a transmitter;

the mobile device receiving a first data stream through the first link;

the mobile device receiving a second data stream through the second link;

displaying the second data stream on the mobile device;

creating transmission statistics related to the second link, wherein the transmission statistics comprise information about the second data stream being displayed on the mobile device;

transmitting the transmission statistics through the first link;

receiving, by the mobile device, a third data stream through the first link from the first data source;

switching from displaying the second data stream on the mobile device to displaying the third data stream based upon the transmission statistics; and receiving a customized purchasing opportunity that is relevant to a wireless user and that is determined based on the information about the second data stream being displayed on the mobile device, wherein the customized purchasing opportunity is received through the first link.

2. The method of claim 1, wherein the transmission statistics are used to determine the location of the mobile device.

3. The method of claim 1, wherein the second data source is a wireless wide area network.

4. The method of claim 2, wherein the transmission statistics are used to provide information about at least one of the user's location and the second data stream.

5. The method of claim 1, wherein the third data stream is displayed when the second data link is degraded.

6. The method of claim 1, wherein the first data stream is provided to display promotional material.

7. The method of claim 1, wherein the second data source is a mobile digital television (MDTV) transmitter.

8. The method of claim 1, wherein the first data source is a transceiver.

9. The method of claim 1, wherein the transmission statistics includes the quality of connection of the second link.

10. The method of claim 1, wherein the transmission statistics comprise one or more of a synchronization signal, a pilot to carrier signal phase measurement, a pilot to carrier noise signal, a frequency offset measurement, a frequency stability measurement, an in-bound signaling measurement, and an out-of-transmission signal measurement.

11. A system for content delivery, comprising:

a mobile digital television transmitter, wherein the mobile digital television transmitter transmits a primary data stream;

a transceiver, wherein the transceiver transmits a secondary data stream;

a mobile device, wherein the mobile device comprises a mobile display, a mobile transceiver, and a mobile processor, wherein the mobile device receives at least the primary data stream and the secondary data stream, and wherein the mobile device displays data from either the primary data stream or the secondary data stream, and wherein the mobile device transmits a mobile data stream to the transceiver, wherein the mobile data stream comprises transmission statistics relating to the status of both the primary data stream and the secondary data stream, wherein the transmission statistics comprise information about the data being displayed from either the primary data stream or the secondary data stream, and wherein the mobile device receives a customized purchasing opportunity through the secondary data stream; and a server, wherein the server is in communication with the transceiver, wherein the server is capable of determining the signal conditions of the mobile device based upon the mobile data stream and alter the secondary data stream based upon the mobile data stream, wherein the server determines the customized purchasing opportunity relevant to a wireless user that is based on the information about the second data stream being displayed on the mobile device.

12. The system of content delivery of claim 11, wherein the mobile data stream allows the server to determine the location of the mobile device.

13. The system of content delivery of claim 11, wherein the secondary data stream comprises promotional material regarding consumer opportunities based upon the mobile data stream.

14. The system of content delivery of claim 11, further comprising a second transmitter, wherein if the signal from the transmitter to the mobile device is lost, the server feeds the primary data stream from the transmitter to the second transmitter and instructs the mobile device to display the primary data stream from the second transmitter.

15. The system of content delivery of claim 12, wherein the secondary data stream comprises promotional material regarding consumer opportunities based upon the location of the mobile device.

* * * * *